US011933021B2

(12) United States Patent
Ready-Campbell et al.

(10) Patent No.: US 11,933,021 B2
(45) Date of Patent: *Mar. 19, 2024

(54) EXCAVATING EARTH FROM A DIG SITE USING AN EXCAVATION VEHICLE

(71) Applicant: Built Robotics Inc., San Francisco, CA (US)

(72) Inventors: Noah Austen Ready-Campbell, San Franciso, CA (US); Gaurav Jitendra Kikani, San Franciso, CA (US); Andrew Liang, San Franciso, CA (US); Pradeesh Suganthan, Mountain View, CA (US); James Alan Emerick, Berkeley, CA (US); Sarah Marie Thornton, Newark, CA (US); Ammar Idris Kothari, San Francisco, CA (US); Edward Joseph Garza, San Francisco, CA (US)

(73) Assignee: BUILT ROBOTICS INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,038

(22) Filed: Oct. 12, 2022

(65) Prior Publication Data

US 2023/0031524 A1 Feb. 2, 2023

Related U.S. Application Data

(63) Continuation of application No. 17/727,559, filed on Apr. 22, 2022, now Pat. No. 11,512,448, which is a
(Continued)

(51) Int. Cl.
E02F 9/20 (2006.01)
E02F 5/14 (2006.01)
E02F 9/26 (2006.01)

(52) U.S. Cl.
CPC ............ *E02F 9/2041* (2013.01); *E02F 9/262* (2013.01); *E02F 9/265* (2013.01); *E02F 5/145* (2013.01)

(58) Field of Classification Search
CPC ......... E02F 9/2041; E02F 9/262; E02F 9/265; E02F 9/2045; E02F 9/205; E02F 5/145; G05D 2201/0202; G05D 1/0274
See application file for complete search history.

(56) References Cited

U.S. PATENT DOCUMENTS 6,954,999 B1 10/2005 Richardson et al.
2007/0240903 A1 10/2007 Alft et al.
(Continued)

OTHER PUBLICATIONS

Bradley et al, D. The Development, Control and Operation of an Autonomous Robotic Excavator, Google Scholar, Journal of Intelligent and Robotic Systems, pp. 73-97. (Year: 1998).*
(Continued)

*Primary Examiner* — Russell Frejd
(74) *Attorney, Agent, or Firm* — Fenwick & West LLP

(57) ABSTRACT

This description provides an autonomous or semi-autonomous excavation vehicle that is capable of navigating through a dig site and carrying an excavation routine using a system of sensors physically mounted to the excavation vehicle. The sensors collect one or more of spatial, imaging, measurement, and location data representing the status of the excavation vehicle and its surrounding environment. Based on the collected data, the excavation vehicle executes instructions to perform an excavation routine by excavating earth from a hole using an excavation tool positioned at a single location within the site. The excavation vehicle is also able to carry out numerous other tasks, such as checking the volume of excavated earth in an excavation tool, navigating the excavation vehicle over a distance while continuously excavating earth from a below surface depth, and preparing
(Continued)

Example Elevation Map
600 a digital terrain model of the site as part of a process for creating the excavation routine.

20 Claims, 9 Drawing Sheets

Related U.S. Application Data continuation of application No. 16/447,971, filed on Jun. 21, 2019, now Pat. No. 11,332,910.

(60) Provisional application No. 62/703,773, filed on Jul. 26, 2018.

(56) References Cited

U.S. PATENT DOCUMENTS

| | | |
|---|---|---|
| 2008/0097672 A1 | 4/2008 | Clark et al. |
| 2008/0127530 A1 | 6/2008 | Kelly |
| 2010/0245542 A1 | 9/2010 | Kim et al. |
| 2013/0006484 A1 | 1/2013 | Avitzur et al. |
| 2014/0277966 A1 | 9/2014 | Kelly |
| 2015/0078837 A1 | 3/2015 | Kruse |
| 2016/0258129 A1 | 9/2016 | Wei et al. |
| 2019/0071841 A1 | 3/2019 | Elkins |

OTHER PUBLICATIONS

Cannon, H. Extended Earthmoving with an Autonomous Excavator, Google Scholar, The Robotics Institute, Carnegie Mellon University, May 1999, 116 pages. (Year: 1999).*
First Office Action, Canadian Intellectual Property Office Patent Application No. 3107035, dated Mar. 22, 2022, 6 pages.
International Search Report and Written Opinion, Patent Cooperation Treaty Application No. PCT/US2019/043324, dated Oct. 17, 2019, 17 pages.
United States Office Action, U.S. Appl. No. 16/447,971, dated Jul. 30, 2021, 18 pages.
United States Office Action, U.S. Appl. No. 17/727,559, dated Jun. 30, 2022, 10 pages.

* cited by examiner

EXCAVATING EARTH FROM A DIG SITE USING AN EXCAVATION VEHICLE

CROSS REFERENCE TO RELATED APPLICATION

This application is a continuation of U.S. application Ser. No. 17/727,559, filed Apr. 22, 2022, now U.S. Pat. No. 11,512,448, which application is a continuation of U.S. application Ser. No. 16/447,971, filed Jun. 21, 2019, now U.S. Pat. No. 11,332,910, which application claims the benefit of U.S. Provisional Application No. 62/703,773 filed on Jul. 26, 2018, all of which are hereby incorporated in their entirety by reference.

BACKGROUND

Field of Art

The disclosure relates generally to method for excavating earth from a dig site, and more specifically to excavating earth using a vehicle operated by a sensor assembly configured to control the vehicle.

Description of the Related Art

Vehicles such as backhoes, loaders, and excavators, generally categorized as excavation vehicles, are used to excavate earth from locations. Currently, operation of these excavation vehicles is very expensive as each vehicle requires a manual operator be available and present during the entire excavation. Further complicating the field, there is an insufficient labor force skilled enough to meet the demand for operating these vehicles. Because these vehicles must be operated manually, excavation can only be performed during the day, extending the duration of excavation projects and further increasing overall costs. The dependence of current excavation vehicles on manual operators increases the risk of human error during excavations and reduce the quality of work done at the site.

SUMMARY

Described is an autonomous or semi-autonomous excavation system that unifies an excavation vehicle with a sensor system for excavating earth from a site. The excavation system controls and navigates an excavation vehicle through an excavation routine of a site. The excavation system uses a combination of sensors integrated into the excavation vehicle to record the positions and orientations of the various components of the excavation vehicle and/or the conditions of the surrounding earth. Data recorded by the sensors may be aggregated or processed in various ways, for example, to determine and control the actuation of the vehicle's controls, to generate representations of the current state of the site, to perform measurements and generate analyses based on those measurements, and perform other tasks described herein.

According to an embodiment, a method for excavating earth at a site includes accessing a target tool path from a computer memory communicatively coupled to an excavation vehicle. A target tool path comprises a set of coordinates within a coordinate space of the site comprising a volume of earth to be dug and a target depth measurement associated with each coordinate of the set. The communicatively coupled computer executes a set of instructions for the excavation vehicle to perform. The excavation vehicle navigates a tool physically coupled to the excavation vehicle to a starting location representing a set of coordinates on the target tool path. The excavation vehicle positions a leading point of the tool at a depth below the ground surface of the starting location and navigates the tool over the target tool path. The excavation vehicle records the actual depth of the earth at each coordinate of the target tool path with a sensor mounted on the excavation vehicle.

The described excavation system reduces the cost of excavating a site by reducing the need for manual labor, by obtaining actionable information that helps design and increase the efficiency of the excavation project, and by improving the overall quality and precision of the project by carrying out consistent, repeatable actions in accordance with excavation plans.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

I. Excavation System

Figure 1:
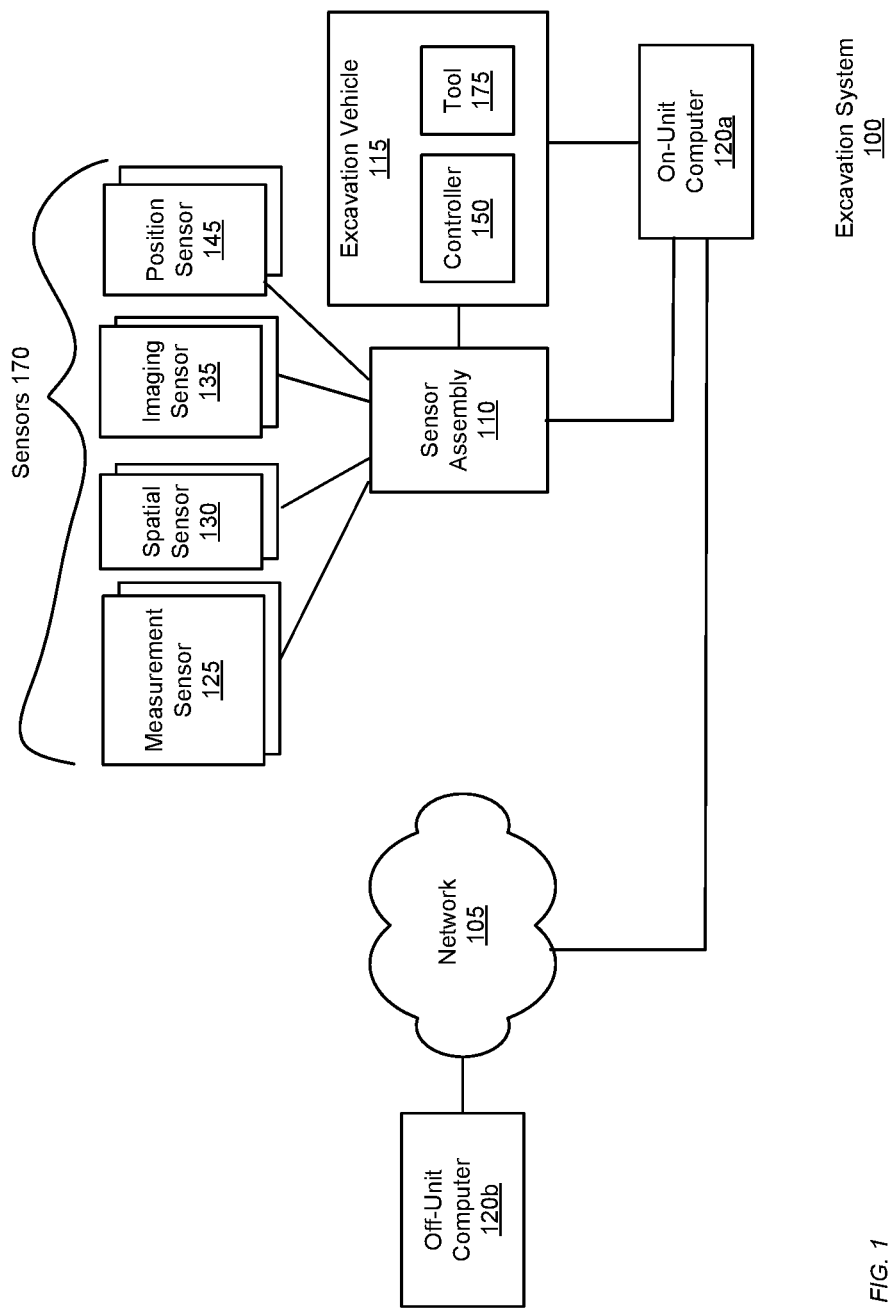
FIG. 1 shows an excavation system for excavating earth, according to an embodiment.
Figure 2A:
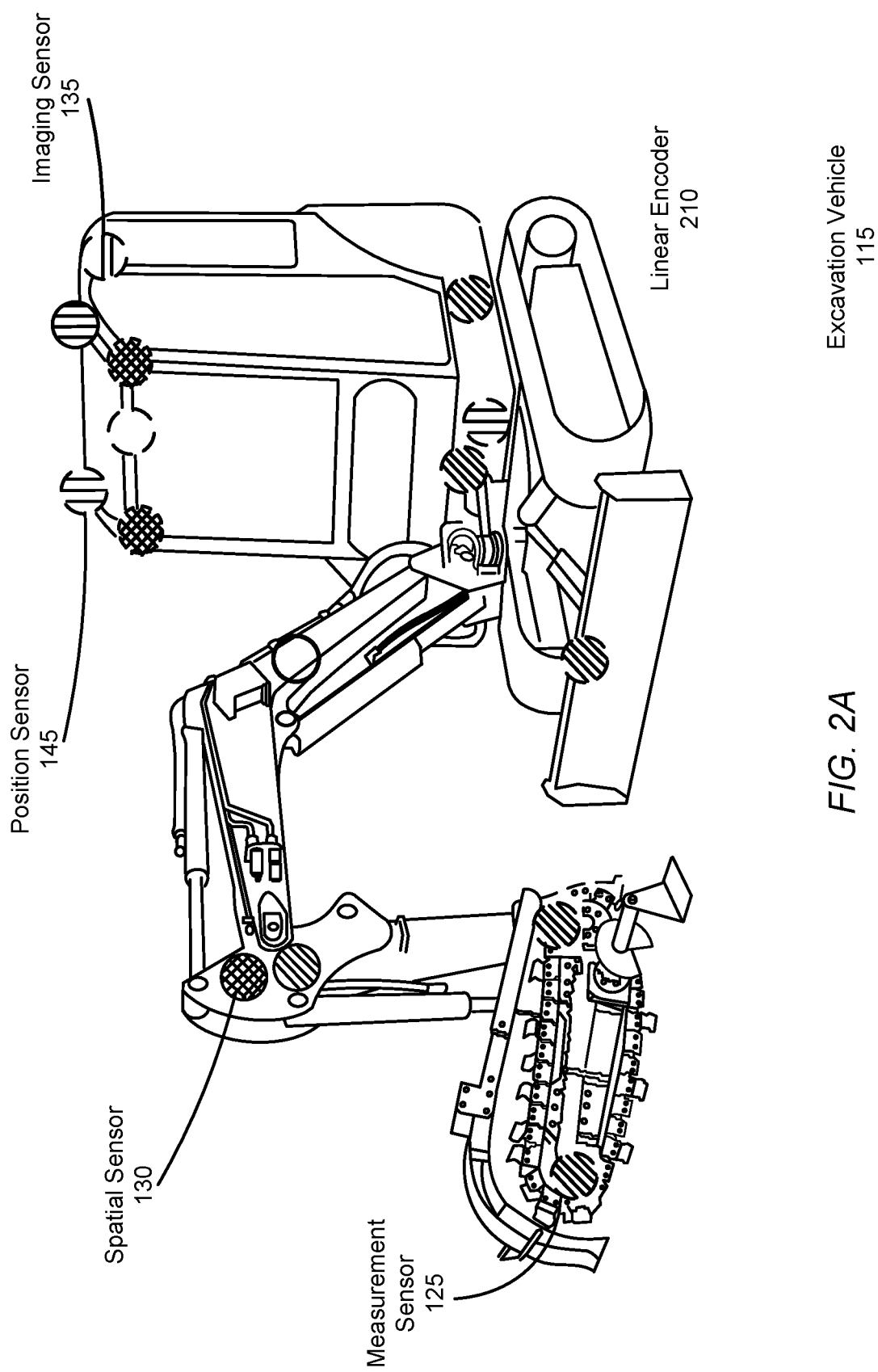
FIG. 2A illustrates the example placement of sensors for a track trencher, according to an embodiment.
Figure 2B:
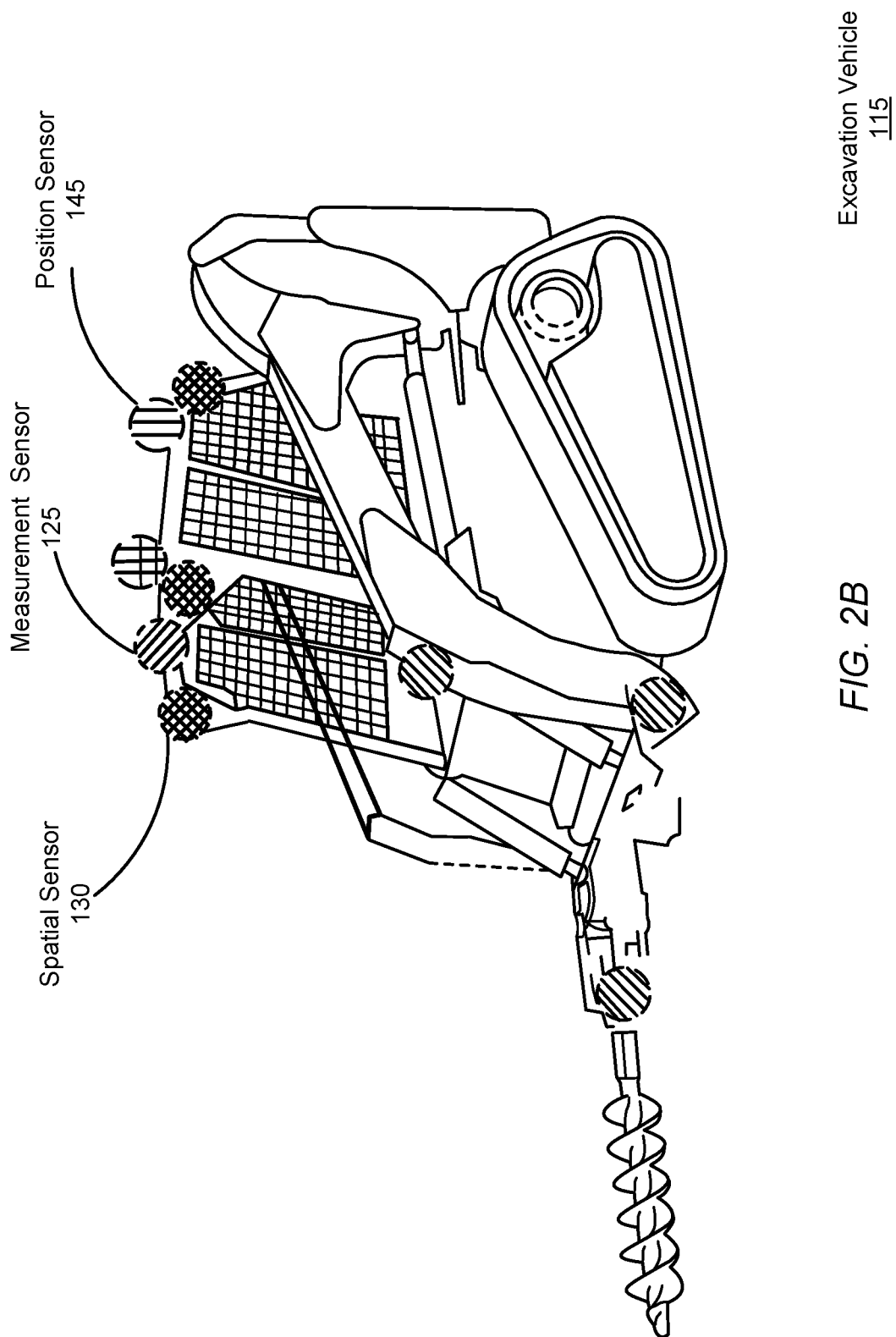
FIG. 2B illustrates the example placement of sensors for a skid-steer loader, according to an embodiment.

FIG. 1 shows an excavation system 100 for excavating earth autonomously or semi-autonomously from a dig site using a suite of one or more sensors 170 mounted on an excavation vehicle 115 to record data describing the state of the excavation vehicle 115 and the excavated site. As examples, FIGS. 2A and 2B illustrate the example placement of sensors for a compact track loader and an excavator, respectively, according to example embodiments. FIGS. 1-2B are discussed together in the following section for clarity.

The excavation system 100 includes a set of components physically coupled to the excavation vehicle 115. These include a sensor assembly 110, the excavation vehicle 115 itself, a digital or analog electrical controller 150, and an on-unit computer 120a. The sensor assembly 110 includes one or more of any of the following types of sensors: measurement sensors 125, spatial sensors 130, imaging sensors 135, and position sensors 145.

Each of these components will be discussed further below in the remaining sub-sections of FIG. 1. Although FIG. 1 illustrates only a single instance of most of the components of the excavation system 100, in practice more than one of each component may be present, and additional or fewer components may be used different than those described herein.

I.A. Excavation Vehicle

The excavation vehicle 115 is an item of heavy equipment designed to excavate earth from a hole within a dig site. Excavation vehicles 115 are typically large and capable of moving large volumes of earth at a single time, particularly relative to what an individual human can move by hand. Generally, excavation vehicles 115 excavate earth by scraping or digging earth from beneath the ground surface. Examples of excavation vehicles 115 within the scope of this description include, but are not limited to loaders such as backhoe loaders, track loaders, wheel loaders, skid steer loaders, scrapers, graders, bulldozers, compactors, excavators, mini-excavators, trenchers, skip loaders.

Among other components, excavation vehicles 115 generally include a chassis 205, a drive system 210, an excavation tool 175, an engine (not shown), an on-board sensor assembly 110, and a controller 150. The chassis 205 is the frame upon on which all other components are physically mounted. The drive system 210 gives the excavation vehicle 115 mobility through the excavation site. The excavation tool 175 includes not only the instrument collecting dirt, such as a bucket or shovel, but also any articulated elements for positioning the instrument for the collection, measurement, and dumping of dirt. For example, in an excavator or loader the excavation tool refers not only to the bucket but also the multi-element arm that adjusts the position and orientation of the tool.

The engine powers both the drive system 210 and the excavation tool 175. The engine may be an internal combustion engine, or an alternative power source, such as an electric motor or battery. In many excavation vehicles 115, the engine powers the drive system 210 and the excavation tool commonly through a single hydraulic system, however other means of actuation may also be used. A common property of hydraulic systems used within excavation vehicles 115 is that the hydraulic capacity of the vehicle 115 is shared between the drive system 210 and the excavation tool. In some embodiments, the instructions and control logic for the excavation vehicle 115 to operate autonomously and semi-autonomously includes instructions relating to determinations about how and under what circumstances to allocate the hydraulic capacity of the hydraulic system.

I.B. Sensor Assembly

As introduced above, the sensor assembly 110 includes a combination of one or more of: measurement sensors 125, spatial sensors 130, imaging sensors 135, and position sensors 145. The sensor assembly 110 is configured to collect data related to the excavation vehicle 115 and environmental data surrounding the excavation vehicle 115. The controller 150 is configured to receive the data from the assembly 110 and carry out the instructions of the excavation routine provided by the computers 120 based on the recorded data. This includes control the drive system 210 to move the position of the tool based on the environmental data, a location of the excavation vehicle 115, and the excavation routine.

Sensors 170 are either removably mounted to the excavation vehicle 115 without impeding the operation of the excavation vehicle 115, or the sensor is an integrated component that is a native part of the excavation vehicle 115 as made available by its manufacturer. Each sensor transmits the data in real-time or as soon as a network connection is achieved, automatically without input from the excavation vehicle 115 or a human operator. Data recorded by the sensors 170 is used by the controller 150 and/or on-unit computer 120a for analysis of, generation of and carrying out of excavation routines, among other tasks.

Position sensors 145 provide a position of the excavation vehicle 115. This may be a localized position within a dig site, or a global position with respect to latitude/longitude, or some other external reference system. In one embodiment, a position sensor is a global positioning system interfacing with a static local ground-based GPS node mounted to the excavation vehicle 115 to output a position of the excavation vehicle 115.

Spatial sensors 130 output a three-dimensional map in the form of a three-dimensional point cloud representing distances, for example between one meter and fifty meters between the spatial sensors 130 and the ground surface or any objects within the field of view of the spatial sensor 130, in some cases per rotation of the spatial sensor 130. In one embodiment, spatial sensors 130 include a set of light emitters (e.g., Infrared (IR)) configured to project structured light into a field near the excavation vehicle 115, a set of detectors (e.g., IR cameras), and a processor configured to transform data received by the infrared detectors into a point cloud representation of the three-dimensional volume captured by the detectors as measured by structured light reflected by the environment. In one embodiment, the spatial sensor 130 is a LIDAR sensor having a scan cycle that sweeps through an angular range capturing some or all of the volume of space surrounding the excavation vehicle 115. Other types of spatial sensors 130 may be used, including time-of-flight sensors, ultrasonic sensors, and radar sensors.

Imaging sensors 135 capture still or moving-video representations of the ground surface, objects, and environment surrounding the excavation vehicle 115. Examples imaging sensors 135 include, but are not limited to, stereo RGB cameras, structure from motion cameras, and monocular RGB cameras. In one embodiment, each camera can output a video feed containing a sequence of digital photographic images at a rate of 20 Hz. In one embodiment, multiple imaging sensors 135 are mounted such that each imaging sensor captures some portion of the entire 360 degree angular range around the vehicle. For example, front, rear, left lateral, and right lateral imaging sensors may be mounted to capture the entire angular range around the excavation vehicle 115.

Measurement sensors 125 generally measure properties of the ambient environment, or properties of the excavation vehicle 115 itself. These properties may include tool position/orientation, relative articulation of the various joints of the arm supporting the tool, vehicle 115 speed, ambient temperature, hydraulic pressure (either relative to capacity or absolute) including how much hydraulic capacity is being used by the drive system 210 and the excavation tool separately. A variety of possible measurement sensors 125 may be used, including hydraulic pressure sensors, linear encoders, radial encoders, inertial measurement unit sensors, incline sensors, accelerometers, strain gauges, gyroscopes, and string encoders.

There are a number of different ways for the sensor assembly 110 generally and the individual sensors specifically to be constructed and/or mounted to the excavation vehicle 115. This will also depend in part on the construction of the excavation vehicle 115. Using the track trencher of FIG. 2A as an example, the representations with diagonal crosshatching represent the example placements of a set of measurement sensors 125, the representation with diamond crosshatching represent example placements of a set of spatial sensors 130, and the representations with grid crosshatching represent example placements of a set of position sensors 145. Using the skid-steer loader of FIG. 2B as another example, diagonal crosshatchings represent measurement sensors 125, diamond crosshatchings represent spatial sensors 130, and grid crosshatchings represent position sensors 145. Additionally vertical crosshatchings near the drive system 210 represent example placements for a linear encoder 210 and horizontal crosshatchings near the roof represent imaging sensors 135, for example RGB cameras.

Generally, individual sensors as well as the sensor assembly 110 itself range in complexity from simplistic measurement devices that output analog or electrical systems electrically coupled to a network bus or other communicative network, to more complicated devices which include their own onboard computer processors, memory, and the communications adapters (similar to on-unit computer 120a). Regardless of construction, the sensors and/or sensor assembly together function to record, store, and report information to the computers 120. Any given sensor may record or the sensor assembly may append to recorded data a time stamps for when data was recorded.

The sensor assembly 110 may include its own network adapter (not shown) that communicates with the computers 120 either through either a wired or wireless connection. For wireless connections, the network adapter may be a Bluetooth Low Energy (BTLE) wireless transmitter, infrared, or 802.11 based connection. For wired connection, a wide variety of communications standards and related architecture may be used, including Ethernet, a Controller Area Network (CAN) Bus, or similar.

In the case of a BTLE connection, After the sensor assembly 110 and on-unit computer 120a have been paired with each other using a BLTE passkey, the sensor assembly 110 automatically synchronizes and communicates information relating to the excavation of a site to the on-site computer 120a. If the sensor assembly 110 has not been paired with the on-unit computer 120 prior to the excavation of a site, the information is stored locally until such a pairing occurs. Upon pairing, the sensor assembly 110 communicates any stored data to the on-site computer 120a.

The sensor assembly 110 may be configured to communicate received data to any one of the controller 150 of the excavation vehicle 115, the on-unit computer 120a, as well as the off-unit computer 120b. For example, if the network adapter of the sensor assembly 110 is configured to communicate via a wireless standard such as 802.11 or LTE, the adapter may exchange data with a wireless access point such as a wireless router, which may in turn communicate with the off-unit computer 120b and also on-unit computer 120a. This type of transmission may be redundant, but it can help ensure that recorded data arrives at the off-unit computer 120b for consumption and decision making by a manual operator, while also providing the data to the on-unit computer 120a for autonomous or semi-autonomous decision making in the carrying out of the excavation plan.

I.C. On-Unit Computer

Data collected by the sensors 170 is communicated to the on-unit computer 120a to assist in the design or carrying out of an excavation routine. Generally, excavation routines are sets of computer program instructions that, when executed control the various controllable inputs of the excavation vehicle 115 to carry out an excavation-related task. The controllable input of the excavation vehicle 115 may include the joystick controlling the drive system 210 and excavation tool and any directly-controllable articulable elements, or some controller 150 associated input to those controllable elements, such as an analog or electrical circuit that responds to joystick inputs.

Generally, excavation-related tasks and excavation routines are broadly defined to include any task that can be feasibly carried out by an excavation routine. Examples include, but are not limited to: dig site preparation routines, excavation routines, fill estimate routines, volume check routines, dump routines, wall cutback routines, backfill/compaction routines. Examples of these routines are described further below. In addition to instructions, excavation routines include data characterizing the site and the amount and locations of earth to be excavated. Examples of such data include, but are not limited to, a digital file, sensor data, a digital terrain model, and one or more target tool paths. Examples of such data are further described below.

The excavation vehicle 115 is designed to carry out the set of instructions of an excavation routine either entirely autonomously or semi-autonomously. Here, semi-autonomous refers to an excavation vehicle 115 that not only responds to the instructions but also to a manual operator. Manual operators of the excavation vehicle 115 may be monitor the excavation routine from inside of the excavation vehicle using the on-unit computer 120a or remotely using an off-unit computer 120b from outside of the excavation vehicle, on-site, or off-site. Manual operation may take the form of manual input to the joystick, for example. Sensor data is received by the on-unit computer 120a and assists in the carrying out of those instructions, for example by modifying exactly what inputs are provided to the controller 150 in order to achieve the instructions to be accomplished as part of the excavation routine.

The on-unit computer 120a may also exchange information with the off-unit computer 120b and/or other excavation vehicles (not shown) connected through network 105. For example, an excavation vehicle 115 may communicate data recorded by one excavation vehicle 115 to a fleet of additional excavation vehicle 115s that may be used at the same site. Similarly, through the network 105, the computers 120 may deliver data regarding a specific site to a central location from which the fleet of excavation vehicle 115s are stored. This may involve the excavation vehicle 115 exchanging data with the off-unit computer, which in turn can initiate a process to generate the set of instructions for excavating the earth and to deliver the instructions to another excavation vehicle 115. Similarly, the excavation vehicle 115 may also receive data sent by other sensor assemblies 110 of other excavation vehicles 115 as communicated between computers 120 over network 105.

The on-unit computer 120a may also process the data received from the sensor assembly 110. Processing generally takes sensor data that in a "raw" format may not be directly usable, and converts into a form that useful for another type of processing. For example, the on unit computer 120a may fuse data from the various sensors into a real-time scan of the ground surface of the site around the excavation vehicle 115. This may comprise fusing the point clouds of various spatial sensors 130, the stitching of images from multiple imaging sensors 135, and the registration of images and point clouds relative to each other or relative to data regarding an external reference frame as provided by position sensors 145 or other data. Processing may also include up sampling, down sampling, interpolation, filtering, smoothing, or other related techniques.

I.D. Off-Unit Computer

The off-unit computer 120b includes a software architecture for supporting access and use of the excavation system 100 by many different excavation vehicles 115 through network 105, and thus at a high level can be generally characterized as a cloud-based system. Any operations or processing performed by the on-unit computer 120a may also be performed similarly by the off-unit computer 120b.

In some instances, the operation of the excavation vehicle 115 is monitored by a human operator. Human operators, when necessary, may halt or override the automated excavation process and manually operate the excavation vehicle 115 in response to observations made regarding the features or the properties of the site. Monitoring by a human operator may include remote oversight of the whole excavation routine or a portion of it. Human operation of the excavation vehicle 115 may also include manual or remote control of the joysticks of the excavation vehicle 115 for portions of the excavation routine (i.e., preparation routine, excavation routine, etc.). Additionally, when appropriate, human operators may override all or a part of the set of instructions and/or excavation routine carried out by the on-unit computer 120a.

I.E. General Computer Structure

The on-unit 120a and off-unit 120b computers may be generic or special purpose computers. A simplified example of the components of an example computer according to one embodiment is illustrated in FIG. 3.

Figure 3:
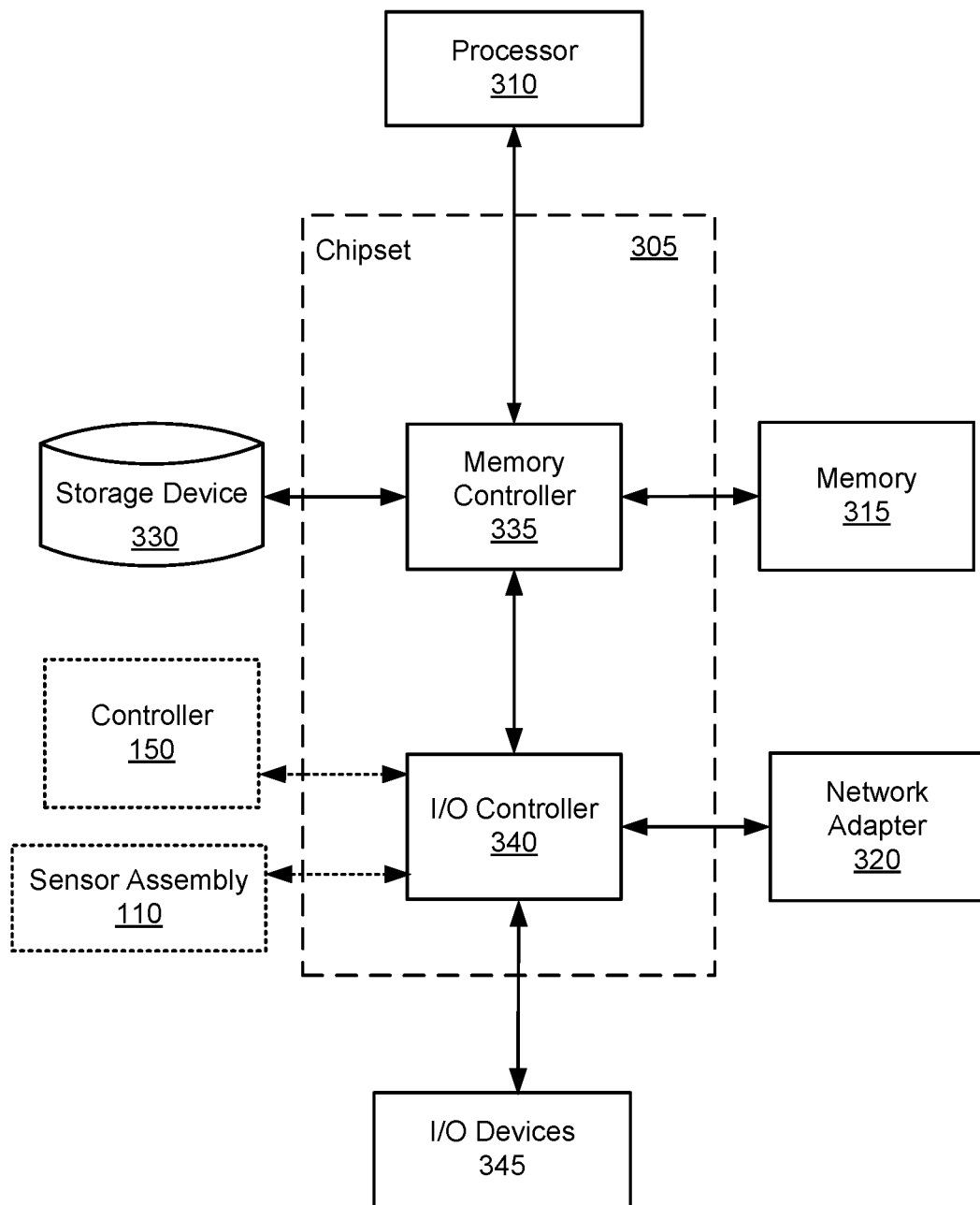
FIG. 3 is a high-level block diagram illustrating an example of a computing device used in an on-unit computer, off-unit computer, and/or database server, according to an embodiment.

FIG. 3 is a high-level block diagram illustrating physical components of an example off-unit computer 120b from FIG. 1, according to one embodiment. Illustrated is a chipset 305 coupled to at least one processor 310. Coupled to the chipset 305 is volatile memory 315, a network adapter 320, an input/output (I/O) device(s) 325, and a storage device 330 representing a non-volatile memory. In one implementation, the functionality of the chipset 305 is provided by a memory controller 335 and an I/O controller 340. In another embodiment, the memory 315 is coupled directly to the processor 310 instead of the chipset 305. In some embodiments, memory 315 includes high-speed random access memory (RAM), such as DRAM, SRAM, DDR RAM or other random access solid state memory devices.

The storage device 330 is any non-transitory computer-readable storage medium, such as a hard drive, compact disk read-only memory (CD-ROM), DVD, or a solid-state memory device. The memory 315 holds instructions and data used by the processor 310. The I/O controller 340 is coupled to receive input from the machine controller 150 and the sensor assembly 110, as described in FIG. 1, and displays data using the I/O devices 345. The I/O device 345 may be a touch input surface (capacitive or otherwise), a mouse, track ball, or other type of pointing device, a keyboard, or another form of input device. The network adapter 320 couples the off-unit computer 120b to the network 105.

As is known in the art, a computer 120 can have different and/or other components than those shown in FIG. 2. In addition, the computer 120 can lack certain illustrated components. In one embodiment, a computer 120 acting as server may lack a dedicated I/O device 345. Moreover, the storage device 330 can be local and/or remote from the computer 120 (such as embodied within a storage area network (SAN)), and, in one embodiment, the storage device 330 is not a CD-ROM device or a DVD device.

Generally, the exact physical components used in the on-unit 120a and off-unit 120b computers will vary. For example, the on-unit computer 120a will be communicatively coupled to the controller 150 and sensor assembly 110 differently than the off-unit computer 120b.

Typically the off-unit computer 120b will be a server class system that uses powerful processors, large memory, and faster network components compared to the on-unit computer 120a, however this is not necessarily the case. Such a server computer typically has large secondary storage, for example, using a RAID (redundant array of independent disks) array and/or by establishing a relationship with an independent content delivery network (CDN) contracted to store, exchange and transmit data such as the asthma notifications contemplated above. Additionally, the computing system includes an operating system, for example, a UNIX operating system, LINUX operating system, or a WINDOWS operating system. The operating system manages the hardware and software resources of the off-unit computer 120b and also provides various services, for example, process management, input/output of data, management of peripheral devices, and so on. The operating system provides various functions for managing files stored on a device, for example, creating a new file, moving or copying files, transferring files to a remote system, and so on.

As is known in the art, the computer 120 is adapted to execute computer program modules for providing functionality described herein. A module can be implemented in hardware, firmware, and/or software. In one embodiment, program modules are stored on the storage device 330, loaded into the memory 315, and executed by the processor 310.

I.F. Network

The network 105 represents the various wired and wireless communication pathways between the computers 120, the sensor assembly 110, and the excavation vehicle 115. Network 105 uses standard Internet communications technologies and/or protocols. Thus, the network 105 can include links using technologies such as Ethernet, IEEE 802.11, integrated services digital network (ISDN), asynchronous transfer mode (ATM), etc. Similarly, the networking protocols used on the network 150 can include the transmission control protocol/Internet protocol (TCP/IP), the hypertext transport protocol (HTTP), the simple mail transfer protocol (SMTP), the file transfer protocol (FTP), etc. The data exchanged over the network 105F can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

II. Excavation Vehicle Operation Overview

Figure 4:
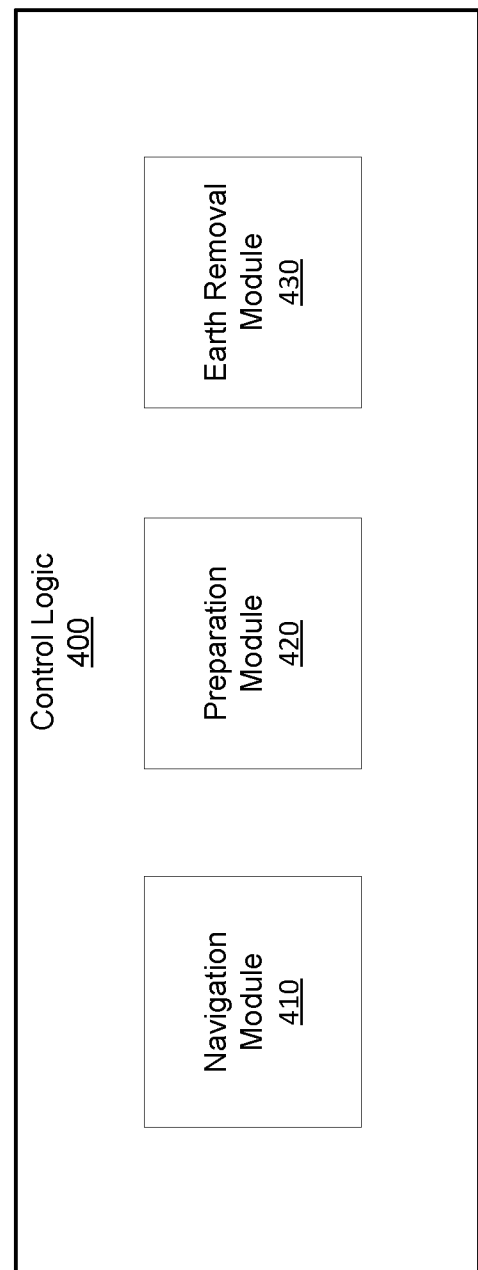
FIG. 4 is a block diagram of the system architecture for controlling an excavation vehicle, according to an embodiment.

FIG. 4 is a diagram of the system architecture for the control logic 400 of an excavation vehicle 115, according to an embodiment. The control logic 400 is implemented by s software within the on-unit computer 120a and is executed by providing inputs to the controller 150 to control the control inputs of the vehicle 115 such as the joystick. The system architecture of the control logic 400 comprises a navigation module 410, a preparation module 420, and an earth removal module 430. In other embodiments, the control logic 400 may include more or fewer modules. Functionality indicated as being performed by a particular module may be performed by other modules instead.

The navigation module 410 is responsible for providing mapping and orientation instructions to the drivetrain 210 of the excavation vehicle 115, allowing the vehicle to navigation through the coordinate space of the site and along the target tool paths within the hole. The preparation module 420 creates and/or converts the digital file describing the target state of the site into a set of target tool paths and the dump site as will be further described in reference to FIG. 5. The earth removal module 430 executes instructions to perform excavation routines in order to physically excavate earth from a location within the site as will be further described in reference to FIG. 7A-7B.

III. Dig Site Preparation Routine

Figure 5:
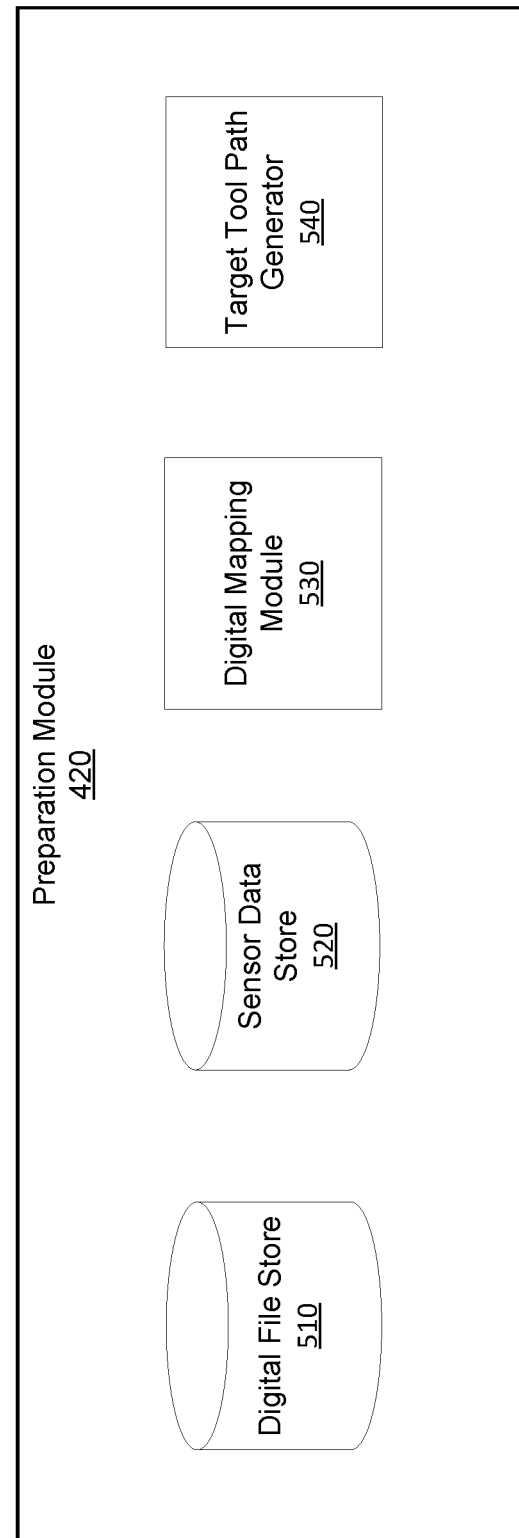
FIG. 5 is a diagram of the system architecture for the preparation module, according to an embodiment.

Prior to the excavation vehicle 115 executing the set of instructions to navigate through the site and excavate earth from a hole, the excavation vehicle 115 generates the set of instructions based on a known target state of the site and contextual data describing the initial state of the site. FIG. 5 is a diagram of the system architecture for the preparation module 420 of an on-site or off-unit computer 120, according to an embodiment. The preparation module 420 generates a digital terrain model detailing one or more plurality of target tool paths which can be followed by the excavation vehicle 115. The system architecture of the preparation module 420 comprises a digital file store 510, a sensor data store 520, a digital mapping module 540, and a target tool path generator 550. In other embodiments, the preparation module 420 may include more or fewer modules. Functionality indicated as being performed by a particular module may be performed by other modules instead. Some of the modules of the preparation module 410 may be stored in the control logic 500.

The digital file store 510 maintains one or more digital files, accessed from a remote database. In some instances, the controller 150 may access these digital files from an off-unit computer 120b and subsequently store them in the digital file store 510. Digital files may be represented as image files describing the geographic layout of the site as a function of location within the coordinate space of the site, with different images representing a hole, dump pile, an entry ramp, etc. Geographic locations in the coordinate space may be represented as one or more two or three dimensional points. The digital file may also include data describing how the excavation vehicle 115 ought to interact with each location discussed in the digital file. The digital files stored in the digital file store 610 may also include a digital file representing a target state of the site once all excavation has been completed. Digital files may be constructed using known computer programs and file types, such as a Computer Aided Design (CAD) file or a Building Information Modeling (BIM) file. For example, the hole may be characterized by a set of target volume dimensions which should be achieved upon the conclusion of the excavation routine. At a boundary of the hole, the digital file may also include a ramp. Additionally, the location of the dump pile may be extracted from the digital file or received manually from a human operator.

A representation of the initial state of the site is generated using sensor 170 data, stored within the sensor data store 520. As the navigation module 410 maneuvers the excavation vehicle 115 through the site, sensors 170 gather contextual information on the site which is aggregated into a representation of the current state of the site. More specifically, spatial sensors 130 record spatial data in the form of point cloud representations, imaging sensors 135 gather imaging data, and depth sensors 145 gather data describing relative locations. More generally, the sensor data store 520 stores contextual information describing the current state of the site which refers to the physical landscape of the site and the physical properties of the soil within the site. The navigation module 410 navigates within the geospatial boundaries defined by the digital file to record contextual information describing the current state of the site.

When recording data via one or more spatial sensors, the spatial sensors 130 record one or more photographic images of various portions of the site and stitches the recorded images into one or more point clouds of data representing the portions of the site to generate a representation of a current physical state of the site. Additionally, for each of the recorded images, the position and orientation of features within the site are recorded and translated into the point cloud representations with respect to the coordinate space of the digital file. In alternative instances, the sensor assembly 110 uses an imaging sensor 135 to record the contextual information as photographic images of portions of the site and, for each of those images, stores the associated positions and orientations of the relevant features within the portion of the site. Additionally, for each of the recorded images, the position and orientation of features within the site are recorded and translated into the point cloud representations with respect to the coordinate space of the digital file. In alternative instances, the sensor assembly 110 uses an imaging sensor 135 to record the contextual information as photographic images of portions of the site and, for each of those images, stores the associated positions and orientations of the relevant features within the portion of the site. In another implementation, the excavation vehicle 115 includes sensors and a software assembly that generates a digital terrain model of the site using simultaneous localization and mapping (SLAM).

Using the generated representation of a current physical state of the site generated based on the sensor data and the representation of the target state of the site, the digital mapping module 530 generates a digital terrain model of the site. By aligning in the coordinate space of the site, the target state of the site with the initial state of the site, differences between the two representations can be identified by the computer 120. For example, the computer 120 may determine a volume of earth to be excavated to form the planned hole from the digital file. In one embodiment, the two representations (the digital file and the contextual data) are aligned (or register) using the known locations of fiducials and other locations within the site common to both representations. Position data from a position sensor 145 such as a GPS may also be used to perform the alignment. Algorithms, such as Iterative Closest Point (ICP) may be used to align the two representations. The boundaries of the sites provided by both representation may also be used to perform the alignment. In one embodiment, for every point pair in the actual/target representations, if the difference in elevation (e.g., Z-axis relative to the ground plane) is greater than a threshold, it is multiplied by the resolution of the representation to calculate a voxel volume, and is then summed together. This can performed at multiple points to determine how the two representations should be adjusted relative to each other along an axis to align them.

In some implementations, the computers 120 use the digital terrain model to determine the difference in volume between the two representations which translates into the volume of earth to be excavated from the hole. Incorporating all the considerations made above, the physical layout of the site, the volume of earth to be excavated, and the creation of cutbacks and slope backs, the computer 120 generates 685 one or more target tool paths.

Using the digital terrain model, the target tool path generator 540 generates one or more target tool paths for the excavation vehicle 115 to move a tool over in order execute a part of the excavation routine, for example excavating a volume of earth, filling a volume of earth, or navigating the excavation vehicle 115 within the site. Tool paths provide geographical steps and corresponding coordinates for the excavation vehicle 115 and/or excavation tool to traverse within the site. When the site is represented in the digital terrain model as a coordinate space, as described above, a target tool path include a set of coordinates within the coordinate space. A target tool path may further represents a measure of volume relative to the volume of the planned hole. For example, if a hole is 4" wide, 3" long, and 2" deep, a single target toolpath includes coordinates within the 12" area of the coordinate space and, at each coordinate, places the tool at a depth of 2" in order to excavate the hole using a single target tool path. Target tool paths may describe a variety of shapes representing a variety of excavation techniques, for example substantially rectangular pathways in two dimensions, substantially triangular pathways in two dimensions, hyperrectangular pathways in three dimensions, hyperrectangular pathways in three dimensions, elliptic pathways in two dimensions, hyperelliptic pathways in three dimensions, or curved lines along the plane of the ground surface.

For holes of greater volumes or requiring a graded excavation, multiple target tool paths may be implemented at different offsets from the finish tool path. For example, if three target tool paths are required to excavate a 6" deep hole, the first may be executed at a depth of 3", the second at a depth 2", and the third at a depth of 1". As a result, a target tool path may represent only a fraction of the volume of excavated earth. For example, the last tool path used at the conclusion of the excavation of the hole may be referred to as a finish tool path, which digs minimal to no volume and which is used merely to even the surface of the bottom of the dug hole. While moving through the finish tool path, the tool excavates less earth from the hole than in previous tool paths by adjusting the depth of the leading edge or the angle of the tool beneath the ground surface. To conclude the excavation routine, the excavation vehicle 115 adjusts a non-leading edge of the tool and reduces the speed of the drive.

For holes of greater volumes or requiring a graded excavation, multiple tool paths may be implemented at different offsets from the finish tool path. For example, if three tool paths are required to excavate a 6" deep hole, the first may be executed at a depth of 3", the second at a depth 2", and the third at a depth of 1". As a result, a tool path may represent only a fraction of the volume of excavated earth. In one embodiment, the number of tool paths may be calculated by dividing the target depth of the hole by the maximum depth that each tool path is capable of In some instances, the maximum depth that each tool path is capable of is also defined by the dimensions of the tool 175 attached to the excavation vehicle 115. In other embodiments, the tool paths may be manually generated using the off-unit computer 120*b*.

Additionally, tool paths may not describe the shape of the hole in three-dimensions, instead removing the depth measurement to only specify a two-dimensional pathway or two-dimensional plane in the three or two dimensional coordinate system. In such instances, the depth instructions for how deep to dig with a tool path may be provided for separately in the set of instructions.

Tool paths are defined based on several factors including, but not limited to, the composition of the soil, the properties of the tool being used to excavate the hole, the properties of the drive system 210 moving the tool, and the properties of the excavation vehicle 115. Example properties of the excavation tool 175 and excavation vehicle 115 include the size of the tool, the weight of the excavation tool, and the force exerted on the excavation tool 175 in contact with the ground surface of the site.

When executed in reverse or in alternative sequences, the processes described above and below with respect to trenching and drilling as specific examples may also perform other excavation routines including, but not limited to, digging, grading, filling, trenching, compacting, aerating, ripping, stripping, spreading, and smoothing.

IV. Earth Removal Routine

IV.A Overview

Figure 6:
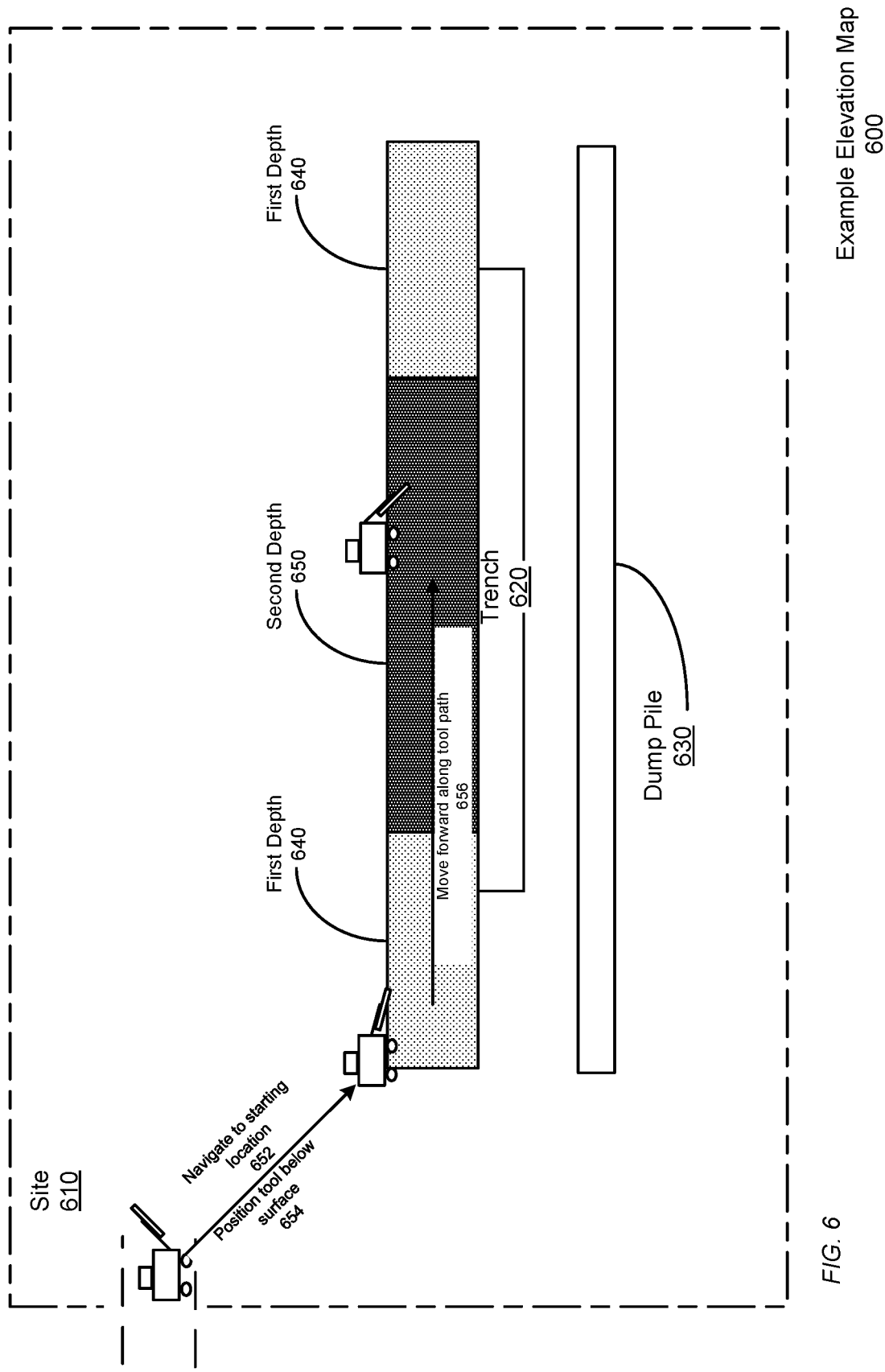
FIG. 6 illustrates an example coordinate space in which an excavation vehicle carries out an excavation routine in a dig site, according to an embodiment.

FIG. 6 illustrates an example coordinate space in which an excavation vehicle carries out an excavation routine in a dig site 610, according to an embodiment. FIG. 6 may be a visual representation of the coordinate space from a digital file detailing the excavation routine. In this example, the excavation vehicle executes an excavation routine to remove earth from a location within the site to create a trench beneath the ground surface of the location. In the digital file, the site 610 is represented as bounded by a site boundary. The digital file further includes data describing the location of a trench 620 and a dump pile 630. The trench 620 refers to the location from which the excavation tool removes earth such that the trench 620 lies at a depth below the ground surface. In some implementations, trench may be designed with a uniform depth across the entire length of the trench. In the illustrated implementation, the trench 620 is excavated to describe different depths at different sections of the trench 620, for example a gradual slope from the ground surface to the bottom of the trench 620. Accordingly, the regions near the ends of the trench 620 are associated with a first depth 640 while the region in the middle of the trench 620 is associated with a second depth 650 greater than the first depth 640. As described herein, earth refers to the ground material and composition of a site, for example, soil, dirt, and gravel.

A trenching excavation vehicle 115 may be implemented to remove earth from a location to design a trench or to break up earth and remove obstacles beneath the ground to allow the excavation vehicle 115 or a different excavation vehicle 115 to remove earth from the location. In either implementation, earth removed from the trench is deposited at a location within the site referred to as the dump pile 630. The dump pile 630 refers to a location within the site where the excavation vehicle 115 releases excavated earth held in the tool. Depending on the type of excavation vehicle 115, the dump pile may be located at a specific point along the trench. When using these types of excavation vehicle 115, for example hydraulic excavators or backhoes, the excavation vehicle 115 collects a threshold amount of earth from the trench 620, navigates to the dump pile 630, and releases earth from the tool onto the dump pile 630. For alternate types of excavation vehicles 115, for example bucket trenchers, chain trenchers, rockwheels, or trenchers of any other variety, the dump pile 630 may run parallel to the length of the trench 620, so that the excavation vehicle 115 simultaneously excavates the earth from the trench 620 and deposits that earth at the dump pile 630. The excavation vehicle 115 may excavate and deposit earth continuously, without interrupting the movement of the excavation tool, while navigating over target tool paths until the trench has been completed.

Walking through an example hypothetical excavation routine for purpose of discussing the concepts introduced in FIG. 6, in one such routine the excavation vehicle 115 enters the site 610 and navigates 652 to a starting location. At the starting location, the excavation vehicle 115 positions 654 the tool beneath the ground surface of the starting position and moves 656 along the prescribed coordinates of the target tool path. At a position in which the first depth 640 transitions to the second depth 650, the excavation vehicle 115 adjusts the position of the tool to a greater depth below the surface before proceeding along the target tool path. Conversely, at the position in which the second depth 650 transitions to the first depth 640, the excavation vehicle 115 raises the position of the tool to be smaller depth below the surface before proceeding along the target tool path to complete the excavation of the trench 620.

FIG. 7 is a diagram of the system architecture for the earth removal module 430 of an excavation vehicle 115, according to an embodiment. The earth removal module is implemented by a software within the on-unit computer 120a and is executed by providing inputs to the controller 150 to control the control input of the vehicle 115 such as the joystick. The system architecture of the earth removal module 430 comprises a depth measurement module 710, a hydraulic distribution module 720, a drilling module 730, and a trenching module 740. In other embodiments, the control logic 400 may include more or fewer modules. Functionality indicated as being performed by a particular module may be performed by other modules instead.

The depth measurement module 710 receives measurements describing the depth of the tool within the excavated trench from various sensors mounted to the excavation vehicle and updates virtual representations of the excavation vehicle 115 within the site. The depth measurement module identifies and analyzes the position of tool beneath the ground surface. In implementations, in which the excavation routine constructs a trench within a site, the excavation machine 115 is a trencher or an alternate vehicle 115 outfitted with trenching or drilling tool, for example an auger, rockwheel, or digging chain. Similarly, in implementations in which excavation vehicle 115 constructs a hole penetrating the ground surface, the excavation vehicle 115 may be outfitted with a drilling tool, for example an auger. In such excavation vehicles 115, the tool makes contact with the surface of the earth at a leading point of the tool. The depth measurement module 710 receives data describing the absolute of the leading point of the tool at depths above or below the ground surface of the site. As referred to hereafter, an absolute position describes an exact position and orientation of an object in a three-dimensional coordinate space. Comparatively, a relative position describes a position or orientation of an object in relation to the absolute position of another object, for example the ground surface of earth at a location.

To determine the position of the leading point of the tool beneath the ground surface, the depth measurement module 710 tracks the relative position of the tool within the coordinate space of the site using one or more of the following: a measurement of the absolute position of the excavation vehicle within the coordinate space of the site taken by a global positioning sensor mounted to the vehicle 115, often referred to as the robot baselink, a measurement of the height of the tool relative to the ground surface determined using forward kinematic analysis, and a measurement of the relative position of the leading point of the tool within the coordinate space taken using a position sensor mounted to the tool. The relative position of the leading point of the tool describes the orientation of the tool relative to the ground surface. The depth measurement module 710 receives all three measurements (i.e., the robot baselink, the height of the tool relative to the ground surface, and the orientation of the leading point relative to the ground surface) and converts the accessed measurements into an absolute position of the leading point of the tool within the virtual representation. The lookup table correlates the aforementioned measurements with an absolute position of the leading point of tool.

In one implementation, the depth measurement module 710 accesses a lookup table stored in the computer memory of computer 120. Lookup tables are generated by measuring the outputs of the sensors, or various measurements, at various positions and orientations of the excavation vehicle 115 and the tool, and correlating the outputs of the sensors with the position of the leading point of the tool. For example, at a robot baselink of 5 meters away from an entry ramp to the site and 5 meters from the parallel site boundary, a tool height of 2 meters below the ground surface, and a tool orientation of 45 degrees relative to the ground surface, the lookup table may indicate an absolute position and orientation of the leading point of the tool beneath the ground surface of the site. The referenced lookup table may differ depending on the type of sensor used and the format of the output provided.

The hydraulic distribution module 720 monitors and adjusts the distribution of hydraulic pressure from the engine that is allocated between the drive system 210 and tool 175. The hydraulic distribution module 720 does this in response to instructions from another module (such as the trenching module 740 as described below) attempting to carry out the excavation routine, as control of the hydraulic pressure dictates the actuation of the tool 175 and movement of the vehicle 115. In practice, the trenching module 740, for example, may specify some device parameter to be maintains, such as the tool 175 breakout angle, and the hydraulic distribution module 720 sets the hydraulic distribution between the tool 175 and drive system 210 to maintain that breakout angle.

Often, the excavation vehicle only has sufficient hydraulic pressure to power a single system at full capacity. As a result, both the drive and tool systems may be powered equivalently at half capacity. However, if, based on soil friction, forces, speeds, tool angles, or other conditions, the angle and depth of the tool cannot be maintained at half capacity, the hydraulic distribution module 720 may redistribute the hydraulic pressure within the system to favor the tool over the drive system (e.g., 75%-25% distribution, or otherwise). The calibration for the hydraulic system may be performed by observing joystick manipulations within the excavation vehicle and recording the changes in pressure distribution.

In moving the tool through the target tool path, the hydraulic distribution module 720 measures the speed of the tool and compares it to a target speed. The target speed refers to the speed that the drive system 210 is traveling. This may be calculated based on the knowledge of the earth of the site exhibiting an industry standard soil friction or a soil friction determined specifically for the excavation vehicle 115, site, or even specific target tool path being executed. If the measured speed is lower than the target speed, the hydraulic distribution module 720 may determine that the soil friction (or force of soil exerted on the tool) is greater than expected, and adjusts the distribution of hydraulic pressure between the drive system and the tool to favor the tool to increase the speed of the tool. While this may be accomplished in some instances by increasing the amount of hydraulic pressure capacity allocated to the drive system, the amount of hydraulic capacity available is finite and so this is not always a viable solution. Often, greater than expected soil friction is due to the tool being too deep (or angled along a path proceeding downward), thus generating more friction and often causing the tool to fall off the target tool path. To compensate, the hydraulic distribution module 720 may adjust the tool to a shallower depth or angle, which will accomplish reducing the soil friction and raising tool speed. This process may play out in reverse for a tool speed greater than expected, which may be adjusted by lowering the tool or setting it at a deeper angle.

The maintenance of the hydraulic capacity in this manner and as described elsewhere herein prevents the excavation from stalling during the excavation routine or from complications regarding raising the excavation tool above the ground surface. In one embodiment, to further maintain sufficient hydraulic capacity for it to be possible to make adjustments to the position and orientation of the tool during the excavation routine, the hydraulic distribution module 720 maintains hydraulic pressure within the hydraulic system below a threshold 90% of the maximum hydraulic pressure capacity.

A breakout event and corresponding breakout angle may be recorded as a result of the tool naturally breaking through the ground surface during the excavation routine. At speeds below the target speed and/or at forces above the threshold force, the tool is unable to collect earth and break out of the ground surface. Similarly, at speeds above the target speed and forces below the threshold force, the tool inefficiently collects earth. As referenced above, forces refer to the forces exerted by the earth on the tool. Breakouts and the speeds and forces that cause them are addressed by module 720 to resume excavating earth if they do occur and hopefully reduce their occurrence overall. This may involve the hydraulic distribution module 720 measuring the force of earth on the tool and adjusting the distribution of pressure so that the tool angle has sufficient hydraulic pressure to be adjusted beneath the ground surface. The tool may be lowered or angled downward to dig more deeply in cases of high speed/low force, and angled upward/raised to dig more shallowly in cases of low speed/high force. Additionally, as the tool moves through the target tool path and collects earth, the excavation vehicle may continuously adjust the angle of the tool and if the tool eventually breaks out of the ground surface, the excavation vehicle 115 records the breakout angle and may voluntarily opt to execute the volume check routine rather than resuming digging.

Additionally, the hydraulic distribution module 720 may use the received set of instructions to maintain the hydraulic capacity of the hydraulic system and decrease the target speed of the drive system 210 by adjusting the distribution of hydraulic pressures. A decrease in target speed results in a reduction of the overall hydraulic pressure in the hydraulic system, thereby ensuring sufficient scope in the hydraulic system to adjust the position and orientation of the tool and with minimal delay during the excavation routine. For example, if the hydraulic pressure within the system is 98% of the maximum hydraulic pressure, exceeding the threshold hydraulic pressure, the hydraulic distribution module 720 can reduce the target speed of the excavation vehicle 115 by dynamically executing instructions to divert hydraulic pressure from the drivetrain to the set of tool actuators. By redistributing hydraulic pressure away from the certain components of engine system and towards other components of the engine system, the hydraulic distribution module 720 can prioritize certain excavation functions and maintain high excavation efficiency by the tool and excavation vehicle 115.

IV.B Drilling Routine

Figure 7A:
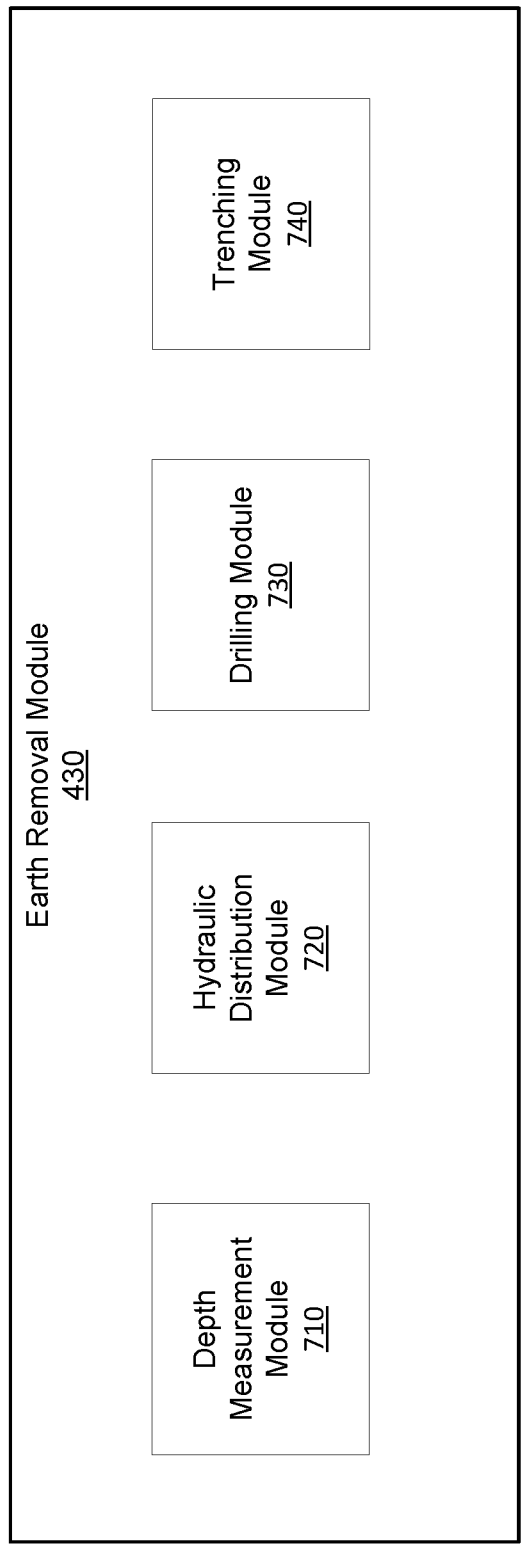
FIG. 7A is a diagram of the system architecture for the earth removal module, according to an embodiment.

Continuing from FIG. 7A, the earth removal module 430 further comprises a drilling module 730. The drilling module 730 generates a set of instructions to be executed by the excavation vehicle 115 in order to dig earth from a location within a site to drill a hole beneath the ground surface. Functionally, excavating earth to drill a hole requires adjusting the position of the leading point of the tool to a depth and, in some implementations, navigating the tool over a linear, vertical distance before readjusting the position of the excavation tool relative to the ground surface. As described above, depending on the dimensions and geometric requirements of the hole, a drilling routine may be executed using a load excavator tool mounted to an excavation vehicle or a drilling-specific vehicle, for example an auger or digging chain.

The drilling module 730 receives a target tool path describing the coordinates of the coordinate space through which the hole extends and a target depth for each coordinate through which the coordinate space extends. In some implementations, the drilling routine may require multiple target tool paths to excavate earth from the hole. For example, if the digital file calls for a hole 12 meters deep, but the tool mounted to the excavation vehicle is only capable of extending 6 meters below the ground surface, two target tool paths may be required. The first target tool path instructs the excavation vehicle 115 to excavate earth from the hole to a uniform depth of 6 meters. At the conclusion of the first target tool path, the second target tool path instructs the excavation vehicle 115 to navigate to the surface of the trench now 6 meters below the ground surface and excavate the remaining 6 meters by navigating over the remaining coordinates of the digital file. Alternatively, the digital file may prescribe a hole with dimensions too wide to be excavated using a single target tool path. More specifically, the width of the tool relative to the target diameter of the hole may require that the excavation vehicle 115 divide the area over which the hole is to be excavated into multiple holes tangent to each other, such that when the drilling routine is completed the multiple holes collapse into a larger hole. In implementations requiring multiple target tool paths to complete a drilling routine, the drilling modules accesses multiple target tool paths, each comprising a set of coordinates within the coordinate space describing a geometry of the earth to be excavated. The geometry of the excavated earth for one target tool path may be characterized by a different target depth than the remaining accessed target tool paths.

In alternate implementations, the drilling module 730 may not receive a target tool path describing instructions for drilling a hole. Instead, the drilling module 730 receive a target depth below the ground surface for the hole. The drilling module 730 instructs the excavation vehicle to begin excavating earth from the hole. As the excavation vehicle 115 removes earth from the hole, measurement sensors 125 and spatial sensors 130 record the depth of the hole and communicates the recorded hole to the drilling module 730. The drilling module 730 compares the recorded depth with the target depth and, if the recorded depth is below the target depth, the excavation vehicle 115 continues to drill the hole. If the recorded depth equals the target depth the, the excavation vehicle 115 halts the drilling of the hole. If the recorded depth is greater than the target depth, the excavation vehicle 115 halts the drilling of the hole and deposits earth into the hole to raise the depth of the hole to match the target depth. In some embodiments, the excavation vehicle 115 excavates the earth from the hole to achieve the target depth in increments below the ground surface.

Based on the instructions generated by the drilling module 730, the excavation vehicle 115 adjusts the distribution of hydraulic pressure to the drivetrain 210 to navigate to the starting point of the target tool path, represented as a coordinate within the coordinate space representing the site. At the start position, the drilling module 730 instructs the hydraulic distribution module 720 to adjust the distribution of hydraulic pressure to move and maintain the leading point of the tool below the ground surface of the start location. The depth below the ground surface to which the tool is moved is received from a target tool path. In order to improve the structural integrity of the hole, the excavation vehicle 115 maintains the leading point of the excavation tool at a fixed angle, for example perpendicular to the ground surface, as it penetrates the ground surface to achieve the target depth.

The drilling module 730 may generate instructions to adjust the angle of the tool beneath the surface, for example detecting an obstacle or a change in the density of the earth. In one implementation, the drilling module 730 measures a force of earth beneath the ground surface of the tool using a kinematic measurement. When the measured force exceeds a threshold force, the drilling module 730 instructs the hydraulic distribution module 720 to adjust the angle of the tool beneath the ground surface to reduce the force exerted on the tool and continue the drilling routine. Alternatively, the drilling module 730 may instruct the hydraulic distribution module 720 to raise the tool above the ground surface before adjusting the angle of the leading point of the tool.

In some implementations, the tool of the excavation vehicle 115 encounters an obstacle beneath the ground surface. An obstacle refers to a structure or material beneath the ground surface which would hinder the adjustment of the excavation tool to the target depth and prevents the excavation tool from excavating earth from the hole, for example trees, pylons, rocks, roots, wooden beans, fire hydrants, curbs, pieces of concrete, utilities, asphalt, and steel. The drilling module 730 receives data from imaging sensors 135 mounted to the excavation vehicle 115, for example a LIDAR sensor, identifying an obstacle beneath the ground surface. In some implementations, the obstacle analysis module performs a computer vision-based object classification module using traditional computer vision techniques or a previously trained neural network. The drilling module 730 generates and delivers a set of instructions to the excavation vehicle 115 describing the identification information describing the one or more physical characteristics of the obstacle derived from the image data recorded by the imaging sensors 135.

Obstacles encountered below the ground surface may be categorized into two categories of obstacles depending on the structural properties or protocols executed to remove the obstacle: modifiable obstacles and immutable obstacles. Immutable obstacles describe obstacles through which the excavation tool may not break through. When encountering an immutable obstacle, the excavation tool may adjust the position of the tool above the ground surface and reposition the excavation tool beneath the ground surface to drill the hole and avoid the immutable obstacle beneath the ground surface.

Unlike immutable obstacles, modifiable obstacles describe obstacles which the excavation tool may break through by adjusting the position of the excavation tool. To remove a modifiable obstacle, the excavation vehicle 115 positions the leading edge of the tool at a first position above the surface of the starting location and adjusts the position of the tool beneath the ground surface over the target tool path. Upon encountering an obstacle along the coordinates of the target tool path, the excavation vehicle 115 halts the navigation of the excavation tool at a second position in contact with the obstacle. In one implementation, the drilling module 730 instructs the excavation vehicle 115 to oscillate the position of the excavation tool between the first position and the second position beneath the ground surface until the surface of the obstacle in the contact with the tool has been removed. Larger obstacles may require repetitions of such oscillations at a plurality of second positions of increasing depths. For example an obstacle that is 2 meters deep encountered at a depth of 4 meters below the ground surface may require three oscillation routines to remove: a first oscillation between the first position and a second position at a depth of 4 meters (in contact with the surface of the obstacle), a second oscillation between the first position and an updated second position at a depth of 5 meters (in contact with the mid-section of the obstacle exposed after the initial surface of the obstacle has been removed), and a third oscillation between the first position and an updated third position at a depth of 6 meters (in contact with the underside of the obstacle exposed after the mid-section surface of the obstacle has been removed.

In some implementations, the drilling module 730 may instruct the excavation vehicle 115 to oscillate the tool between a first position and a second position even when an obstacle is not present. In such implementations, the excavation vehicle 115 may oscillate the tool to refine the interior edges of the tool or to navigate the tool through denser or firmer earth material towards the target depth. Additionally, in some implementations, the drilling module may activate an alternative tool, for example an auger, to oscillate between the first position and a plurality of depths within the hole.

To measure the depth of hole and to compare the depth of the hole to the target depth, the drilling module 730 receives a measurement of the absolute position of the tool from a global positioning sensor mounted to the leading point of the tool. The excavation vehicle may also include an incline sensor mounted to the arm of excavation tool responsible for adjusting the position of the tool, such that the position of the arm correlates to the position of the tool. For example, a measurement indicating that the arm is parallel to the ground surface of the site may indicate that the tool is perpendicular to the ground surface or a measurement that the arm is perpendicular to the ground surface of the site may indicate that the tool is parallel to the ground surface.

In alternate implementations, the excavation vehicle 115 measures the depth of the hole by determining the absolute position of the tool using forward kinematic analyses of the tool consistent with the description above. The drilling module 730 compares the measurement of the absolute position of the tool with the target depth as defined by the target tool path. If the absolute position and the target depth are within a threshold distance of each other, the drilling module 730 may instruct the excavation vehicle to execute the subsequent target tool path, whether that be an additional set of drilling instructions or instructions for the excavation vehicle 115 to navigate to another location within the site. Upon determining that the absolute position of the leading point of the tool matches the target depth of the hole or is within a threshold distance of the target depth of the hole, the drilling module 730 may instruct the excavation vehicle to adjust the position of the tool to be above the ground surface thereby concluding the drilling routine.

If the absolute position and the target depth are above a threshold distance of each other, the drilling module 730 may instruct the excavation vehicle to reposition the leading point of the excavation tool above the ground surface of the start location and repeat the execution of the target tool path. In some implementations, as the tool is moved over a target tool path, soil friction, soil density, or soil composition factors may result in the tool deviating from the target tool path, potentially causing the difference between the actual position of the tool and the target depth, to create an actual tool path that was travelled by the tool. Because of the deviation between the target tool path and the actual tool path, the actual tool path is associated with a different set of coordinates within the coordinate spaces than those associated with the target tool path. In one implementation, the drilling module 730 repeats the same target tool path until the deviation between the target tool path and the actual tool path is less than a threshold deviation, or until some other outcome is achieved, such as a threshold amount of earth is removed.

The drilling module 730 may determine the volume of earth excavated from the hole as a function of the diameter or the radius of the hole and depth of the leading point of the tool, assuming that the hole resembles a circle. When the hole does not resemble a circle, the drilling module 730 may determine the volume of earth excavated from the hole based on depth, width, and length dimensions of the hole. The drilling module 730 may also use spatial, measurement, or imaging sensors mounted to the excavation vehicle 115 to measure the amount of earth excavated from the hole and deposited at the dump pile. In some implementations, the drilling module 730 may also determine the swell factor of earth within the site by comparing the difference in volume of earth deposited at the dump pile to the available volume of the excavated trench.

IV.B Trenching Routine

FIG. 7A further comprises a trenching module 740 which generates a set of instructions to excavate earth from a trench as described in reference to FIG. 6. Functionally, trenching routines as generated by the trenching module 740 are similar to the drilling routines generated by the drilling module 730. The trenching module 740 incorporates all of the aforementioned techniques discussed in reference to the drilling module, for example determining the absolute position of the leading point of the tool beneath the ground surface and positioned the tool beneath the ground surface. Unlike drilling routines in which the excavation vehicle 115 navigates to a start position and holds that position while drilling the hole, trenching routines generally specify that the excavation vehicle 115 to first navigate to a start position, adjust the position of the tool to a target depth below the ground surface, and navigate the excavation vehicle from the start position to an end position located a distance away over a linear path before readjusting the position of the excavation tool relative the ground surface. Depending on the dimensions and geometric requirements of the trench, a trenching routine may be executed using a load excavator tool mounted to an excavation vehicle or a trenching-specific vehicle, for example a rockwheel or digging chain.

The trenching module 740 receives a target tool path describing the coordinates of the coordinate space through which the trench extends and a target depth for each coordinate through which the coordinate space extends. In some implementations, the trenching routine may require multiple target tool paths to excavate earth from the trench. For example, if the digital file calls for a trench 12 meters deep, but the tool mounted to the excavation vehicle is only capable of extending 6 meters below the ground surface, two target tool paths may be required. The first target tool path instructs the excavation vehicle 115 to excavate earth from the trench to a uniform depth of 6 meters and, at the conclusion of the first target tool path, the second target tool path instructs the excavation vehicle 115 to excavate the remaining 6 meters by navigating over the same coordinates as the first target tool path. Alternatively, the digital file may prescribe a trench with dimensions too wide to be excavated using a single target tool path. More specifically, the width of the tool relative to the target width of the trench may require that the excavation vehicle 115 divide the area over which the trench is to be excavated into multiple parallel strips representing separate target tool paths.

In alternate implementations, the trenching module 740 may not receive a target tool path describing instructions for generating the trench. Instead, the trenching module 740 receive a representative line along which a trench should be excavated and a target depth below the ground surface for that trench. The trenching module 740 instructs the excavation vehicle to begin excavating earth along the representative line. As the excavation vehicle 740 removes earth from the trench, measurement sensors 125 and spatial sensors 130 record the depth of the trench and communicate the recorded depth to the trenching module 740. The trenching module 740 compares the recorded depth with the target depth and, if the recorded depth is below the target depth, the excavation vehicle 115 continues to excavate the trench. If the recorded depth equals the target depth, the excavation vehicle 115 halts the excavation of the trench. If the recorded depth is greater than the target depth, the excavation vehicle 115 halts the excavation of the trench and deposits earth into the trench to raise the depth of the trench to match the target depth. In some embodiments, the excavation vehicle 115 excavates the earth from the trench to achieve the target depth in segments along the representative line, whereas in other embodiments, the vehicle 115 excavates the earth from trench to achieve the target depth in a continuous movement over the representative line.

Based on the instructions generated by the trenching module 740, the excavation vehicle 115 adjusts the distribution of hydraulic pressure to the drivetrain 210 to navigate to the starting point of the target tool path, represented as a coordinate within the coordinate space representing the site. At the start position, the trenching module 740 instructs the hydraulic distribution module 720 to adjust the distribution of hydraulic pressure to move and maintain the leading point of the tool below the ground surface of the start location. The depth below the ground surface to which the tool is moved is received from a target tool path which the excavation vehicle 115 is to follow. In order to improve the structural integrity of the trench, the excavation vehicle 115 maintains the leading point of the excavation tool at a fixed angle as it penetrates the ground surface to achieve the target depth. For example, a target tool path prescribes an angle of entry for the leading point of the tool at the start location to be 45°. The leading point of the tool penetrates to a target depth of 6 meters below the ground surface while maintaining a 45° angle. Resultantly, once completed, the end of the trench including the starting location exhibits a ramp to the bottom of the trench at a 45° angle.

In implementations in which an excavator (i.e., a load excavator) excavates a trench, the excavation tool is an instrument for collecting dirt, such as a bucket or a shovel mounted to a multi-element arm that adjusts the position and orientation of the tool. Compared to tools mounted to conventional trenching-specific vehicles, for example a rockwheel or digging chain, a tool mounted to an excavator may be instructed to refine an excavated trench following the excavation of the trench. The trenching module 740 may generate instructions for excavating earth from the trench by causing a load excavator to adjust the distribution of hydraulic pressure to lower the leading edge of the tool below the ground surface and raise the leading edge above the ground surface. In such embodiments, the dimensions of the trench may be correlated with dimension of the excavation tool. For example, for a bucket or shovel mounted to the excavator has a width of 6 meters, the target tool path may represent a trench with a width of at least 6 meters to accommodate the width of the tool. In another example in which the bucket or shovel mounted to the excavator has a width of 6 meters and a target tool path describes a trench with a width of 5 meters, the trenching module 740 may instruct the excavator to excavate earth from a trench at least 6 meters. After completing that excavation routine, the trenching module 740 may instruct the excavator or an alternate excavation vehicle to refill the sides of the trench using earth deposited in a dump pile to achieve the target with of 5 meters.

After the excavation of a trench, the trenching module 740 may generate instructions for a load excavator to adjust the hydraulic pressure to actuate the tool to refine various edges of the trench. The trenching module 740 may adjust the distribution of hydraulic pressure throughout the elements of the arm to hold the position and orientation of the excavator tool steady. Held at the fixed position and orientation, the back of the excavator tool may be navigated across a floor of the trench to smooth the surface of the floor. Similarly, the excavator tool may be held at other orientations of positions to smooth or refine other aspects of the excavated trench including the side walls of the trench, the perimeter of the top of the trench, and the top of the trench.

More information regarding the excavation of earth using a load excavator can be found in U.S. patent application Ser. No. 15/877,217, filed Jan. 22, 2018, and International Application No. PCT/US2018/014727, filed Jan. 22, 2018, both of which are incorporated by reference herein in their entirety.

The trenching module 740 may generate instructions to adjust the angle of the tool beneath the surface, for example detecting an obstacle or a change in the density of the earth. The trenching module 740 may receive data recorded by an imaging sensor 135, for example, LIDAR sensor, identifying an obstacle beneath the ground surface. In another implementation, the trenching module 740 measures a force of earth beneath the ground surface of the tool using a kinematic measurement. When the measured force exceeds a threshold force, the trenching module 740 instructs the hydraulic distribution module 720 to adjust the angle of the tool beneath the ground surface to reduce the force exerted on the tool and continue the trenching routine. Alternatively, the trenching module 740 may instruct the hydraulic distribution module 720 to raise the tool above the ground surface before adjusting the angle of the leading point of the tool. Trenching routines, depending on the implementation, may require that the trench be excavated at varying depths. For example, wastewater management concerns require trenches be constructed at uniform depths throughout the entirety of the trench, whereas trenches built around buildings require varying depths through the trench to improve structural integrity. Additionally, the trenching module 740 may generate instructions for the detection and removal of obstacles beneath the ground surface consistent with the description provided above with reference to the drilling module 730.

Similar to the description provided in reference to the drilling module 730, the trenching module 740 may determine that the current depth, length or width of the trench does not equal the target dimensions of the trench by comparing the actual tool path of the tool and vehicle 115 with the target tool path. If the difference between any one dimension of the actual tool path and the target tool path exceeds a threshold difference, the trenching module 740 instructs the excavation vehicle 115 to repeat the target tool path one or more times until the difference between each dimension of the actual tool path and the target tool path are within a threshold difference.

After the trenching module 740 determines that the absolute position of the tool matches the target depth of the trench or is within a threshold distance of the target depth of the trench, the excavation vehicle 115 navigates forward over the target tool path to form the long-axis of the trench. In some implementations, after traversing the distance of the target tool path, the excavation vehicle 115 may execute a second target tool path to complete the excavation of the trench, for example by widening or deepening the trench. When widening the trench, subsequent target tool paths align adjacently to the first target tool path such that subsequent tool paths increase the width of the trench from the initial width excavated based on the first target tool path.

Periodically during the trenching routine or at the conclusion of the trenching routine, the trenching module 740 may determine the volume of earth excavated from the hole as a function of the diameter of the depth of the leading point of the tool, the distance of traversed by the tool, and a width of the excavated area. Each of these measurements may be recorded using measurement or spatial sensors mounted to the excavation vehicle 115. The trenching module 740 may also use spatial, measurement, or imaging sensors mounted to the excavation vehicle 115 to measure the amount of earth excavated from the hole and deposited at the dump pile. In implementations involving a load excavator tool or a functionally similar tool mounted to the excavation vehicle 115, the trenching routine includes a set of instructions to determine the fill level of the tool using measurement or spatial sensors. If the measurement of earth in the tool exceeds a threshold measurement, the trenching module 740 may instruct the excavation vehicle 115 to adjust the position of the tool above the ground surface and navigate to a dump pile to release the earth. Once the tool has been emptied, the excavation vehicle 115 returns to the most recent coordinate of the target tool path and continues to execute the target tool path.

After excavating the trench, the trenching module 740 may receive data from an imaging sensor 135, for example a LIDAR or vision sensor system, detecting loose earth at the floor of the trench, around the perimeter of the trench, or in the side walls of the trench. To compact the loose earth into the walls or floor of the trench or to remove the loose earth from the trench, the excavation vehicle 115 may either excavate the earth using an excavation tool mounted to the trenching vehicle or may call an additional excavation vehicle, for example a load excavator, to remove and deposit the earth at a dump pile.

III.B Process for Excavating Earth to Form a Trench

Figure 7B:
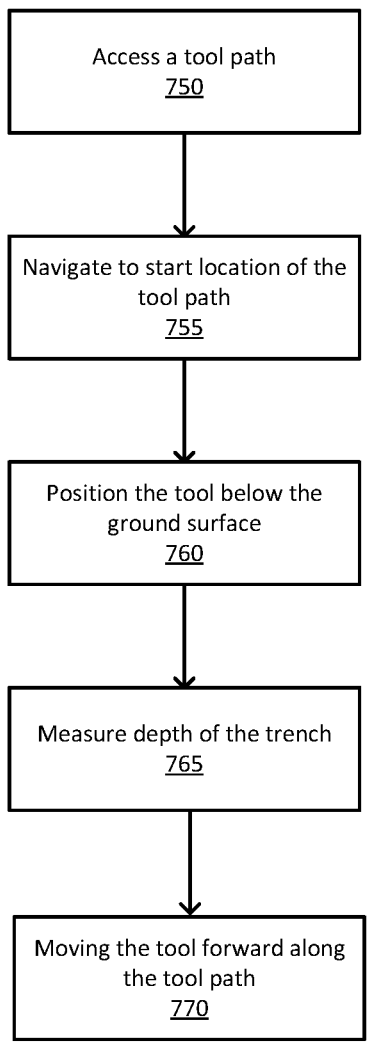
FIG. 7B is a flow chart describing the process for removing earth from a site to form a trench, according to an embodiment.

To implement the system architecture of the earth removal module 430, FIG. 7B shows an example flow chart describing the process for removing earth to form a trench, according to an embodiment. The trenching module 740 (or in implementations in which a hole is being excavated beneath the ground surface, the drilling module 730) accesses 750 a target tool path describing the coordinates over which the excavation vehicle and the excavation tool are to navigate to excavate the trench. The excavation vehicle 115 navigates 755 to a starting location of the tool path which represents the first location at which the trench is to be excavated. the starting point may also be thought of as the first point from which the trench originates. The excavation vehicle 115 positions 760 the tool below the ground surface of the excavation vehicle 115 using the techniques described above to excavate earth from the trench. Simultaneous with the positioning of the tool below the ground surface, the sensors mounted to the excavation vehicle 115 measure 765 the depth of the trench and transmit the measurement for the trenching module 740 to compare to the target depth of the target tool path. After determining that the measured depth of the trench is approximately equivalent to the target depth, the excavation vehicle 115 moves 770 the tool forward over the target tool path to generate the length dimension of the trench. Depending on the geometric requirements of the trench and the number of target tool paths required to accomplish that geometry, the above described process may be repeated for multiple target tool paths.

In some implementations, the trenching module 740 may generate instructions for the excavation vehicle 115 to excavate a trench of varying depths. The instructions for excavating earth from such a trench may be generated by the trenching module 740 as instructions for excavating three separate trenches. For example, a target tool path for a trench 15 meters long may include instructions to generate a first trench 5 meters long at a first depth, a second trench 5 meters long at a second depth, and a third trench 5 meters long at a third depth. The excavation vehicle 115 may excavate earth from over the first 5-meter distance to achieve at the first depth. At the end of the first trench, the excavation vehicle 115 adjusts the excavation tool to an orientation and position capable of excavating earth at the second depth. The excavation vehicle 115 may excavate earth over the next 5-meter distance to achieve the second depth. At the end of the second trench, the excavation vehicle 115 again adjusts the excavation tool to an orientation and position capable of excavating earth at the third depth and navigates over the final 5 meters do excavate the third trench.

As another example, the trenching module 740 may generate two sets of instructions for excavating two trenches at the same depth. In such an embodiment, the excavation vehicle 115 may execute a target tool path to excavate a first trench before navigating to the start point of the second trench and executing the target tool path for the second trench. In implementations in which two trenches intersect (i.e., the end point of the first trench is a start point of the second trench), the excavation vehicle 115 may conclude the first target tool path and immediately transition to execute the second target tool path.

In more complex implementations, the earth removal module 430 may generate instructions to excavate a trench in combination with instructions for an alternate excavation routine generated by the earth removal module 430. For example, a target tool path or digital file may include instructions for excavating a trench with a drilled hole at one end. The earth removal module 430 may generate two sets of target tool paths: one for excavating the trench and a second for excavating the drill. Both tool paths may be executed by a single excavation vehicle outfitted with excavation tools capable of executing both tasks or by separate vehicles, for example a trencher and an auger, operating cooperatively. In another implementation, the earth removal module 430 may generate instructions to excavate a trench with an excavation feature, for example a drilled hole, in the middle of the trench. In such an embodiment, an excavation vehicle 115 or combination of vehicles 115 may halt the execution of a tool path for excavating the trench and transition to execute a tool path for drilling the hole. After the hole has been drilled, the excavation vehicle(s) 115 resume executing the target tool path for excavating the trench. In addition to the examples described above, instructions for executing a trench may be combined, as a single tool path or separate tool paths, with instructions for other excavation routines, for example earth moving, grading, filling, obstacle removal, or any other excavation routines.

Alternatively, the instructions for excavating earth from the trench in the above example may be generated by the trenching module 740 as instructions for excavating three separate trenches.

VI. Additional Considerations

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    accessing, by an autonomous construction vehicle, instructions identifying a plurality of starting locations, and, for each starting location, a target depth corresponding to the starting location;
    autonomously moving, by the autonomous construction vehicle, to a first starting location;
    autonomously drilling, by the autonomous construction vehicle, a first component to the target depth corresponding to the first starting location;
    autonomously moving, by the autonomous construction vehicle, to a second starting location; and
    autonomously drilling, by the autonomous construction vehicle, a second component to the target depth corresponding to the second starting location.

2. The method of claim 1, wherein the autonomous construction vehicle is configured to position the first component prior to drilling the first component by maintaining an edge of the first component at a fixed angle below a surface at the first starting location until a sensor of the autonomous construction vehicle records the target depth corresponding to the first starting location.

3. The method of claim 1, wherein the autonomous construction vehicle is configured to determine if the first component is below the target depth corresponding to the first starting location and to raise the first component in response.

4. The method of claim 1, wherein the autonomous construction vehicle is configured to determine if the first component is above the target depth corresponding to the first starting location and to lower the first component in response.

5. The method of claim 4, wherein the autonomous construction vehicle is configured to adjust an angle of the first component in response to determining if the first component is above the target depth corresponding to the first starting location.

6. The method of claim 1, wherein the target depth corresponding to the first starting location is different from the target depth corresponding to the second starting location.

7. The method of claim 1, wherein the first starting location and the second starting location are autonomously selected by the autonomous construction vehicle.

8. A non-transitory computer readable storage medium storing instructions for excavating material at a site encoded thereon that, when executed by a processor of an autonomous construction vehicle, cause the autonomous construction vehicle to perform steps comprising:
    accessing, by the autonomous construction vehicle, instructions identifying a plurality of starting locations, and, for each starting location, a target depth corresponding to the starting location;
    autonomously moving, by the autonomous construction vehicle, to a first starting location;
    autonomously drilling, by the autonomous construction vehicle, a first component to the target depth corresponding to the first starting location;
    autonomously moving, by the autonomous construction vehicle, to a second starting location; and
    autonomously drilling, by the autonomous construction vehicle, a second component to the target depth corresponding to the second starting location.

9. The non-transitory computer readable storage medium of claim 8, wherein the autonomous construction vehicle is configured to position the first component prior to drilling the first component by maintaining an edge of the first component at a fixed angle below a surface at the first starting location until a sensor of the autonomous construction vehicle records the target depth corresponding to the first starting location.

10. The non-transitory computer readable storage medium of claim 8, wherein the autonomous construction vehicle is configured to determine if the first component is below the target depth corresponding to the first starting location and to raise the first component in response.

11. The non-transitory computer readable storage medium of claim 8, wherein the autonomous construction vehicle is configured to determine if the first component is above the target depth corresponding to the first starting location and to lower the first component in response.

12. The non-transitory computer readable storage medium of claim 11, wherein the autonomous construction vehicle is configured to adjust an angle of the first component in response to determining if the first component is above the target depth corresponding to the first starting location.

13. The non-transitory computer readable storage medium of claim 8, wherein the target depth corresponding to the first starting location is different from the target depth corresponding to the second starting location.

14. The non-transitory computer readable storage medium of claim 8, wherein the first starting location and the second starting location are autonomously selected by the autonomous construction vehicle.

15. An autonomous construction vehicle comprising:
    a processor; and
    a non-transitory computer readable storage medium storing instructions for excavating material at a site encoded thereon that, when executed by a processor, cause the autonomous construction vehicle to perform the steps comprising:
        accessing, by the autonomous construction vehicle, instructions identifying a plurality of starting locations, and, for each starting location, a target depth corresponding to the starting location;
        autonomously moving, by the autonomous construction vehicle, to a first starting location;

autonomously drilling, by the autonomous construction vehicle, a first component to the target depth corresponding to the first starting location;

autonomously moving, by the autonomous construction vehicle, to a second starting location; and autonomously drilling, by the autonomous construction vehicle, a second component to the target depth corresponding to the second starting location.

16. The autonomous construction vehicle of claim 15, wherein the autonomous construction vehicle is configured to position the first component prior to drilling the first component by maintaining an edge of the first component at a fixed angle below a surface at the first starting location until a sensor of the autonomous construction vehicle records the target depth corresponding to the first starting location.

17. The autonomous construction vehicle of claim 15, wherein the autonomous construction vehicle is configured to determine if the first component is below the target depth corresponding to the first starting location and to raise the first component in response.

18. The autonomous construction vehicle of claim 15, wherein the autonomous construction vehicle is configured to determine if the first component is above the target depth corresponding to the first starting location and to lower the first component in response.

19. The autonomous construction vehicle of claim 18, wherein the autonomous construction vehicle is configured to adjust an angle of the first component in response to determining if the first component is above the target depth corresponding to the first starting location.

20. The autonomous construction vehicle of claim 15, wherein the target depth corresponding to the first starting location is different from the target depth corresponding to the second starting location.

* * * * *